(12) United States Patent
Somieski et al.

(10) Patent No.: US 11,662,475 B2
(45) Date of Patent: May 30, 2023

(54) TIME STAMPING ASYNCHRONOUS SENSOR MEASUREMENTS

(71) Applicant: u-blox AG, Thalwil (CH)

(72) Inventors: Alexander Somieski, Oberrieden (CH); Christoph Schmid, Dietikon (CH); Etienne Favey, Thalwil (CH)

(73) Assignee: u-blox AG, Thalwil (CH)

(*) Notice: Subject to any disclaimer, the term of this patent is extended or adjusted under 35 U.S.C. 154(b) by 697 days.

(21) Appl. No.: 16/721,530

(22) Filed: Dec. 19, 2019

(65) Prior Publication Data

US 2021/0190966 A1    Jun. 24, 2021

(51) Int. Cl.
*G01S 19/37* (2010.01)
*G01S 19/09* (2010.01)
*G01S 19/24* (2010.01)
*G01S 19/00* (2010.01)

(52) U.S. Cl.
CPC .............. *G01S 19/37* (2013.01); *G01S 19/09* (2013.01); *G01S 19/243* (2013.01)

(58) Field of Classification Search
CPC ........ G01S 19/37; G01S 19/09; G01S 19/243; G01S 19/35; G01S 19/49; G01S 19/48; G01S 19/47; G01C 21/165; H04J 3/0644; H04J 3/0682; G05D 1/0278; G05D 1/0276
See application file for complete search history.

(56) References Cited

U.S. PATENT DOCUMENTS

| | | | |
|---|---|---|---|
| 6,574,244 B1 | 6/2003 | Petrie | |
| 10,816,995 B2 * | 10/2020 | Zhang | G05D 1/0278 |
| 2015/0185054 A1 | 7/2015 | Hesch et al. | |
| 2017/0108612 A1 | 4/2017 | Aguib et al. | |
| 2018/0088584 A1 * | 3/2018 | Tascione | G05D 1/0276 |
| 2019/0317507 A1 * | 10/2019 | Zhang | G05D 1/0278 |

FOREIGN PATENT DOCUMENTS

| | | | | |
|---|---|---|---|---|
| CN | 103616710 A | * | 3/2014 | G01S 19/47 |
| CN | 107659367 A | * | 2/2018 | H04J 3/0644 |
| WO | WO2019/215473 A1 | * | 11/2019 | H04J 3/0682 |

OTHER PUBLICATIONS

"The Authoritative Dictionary of IEEE Standards Terms, Seventh Edition," in IEEE Std 100-2000 , vol. no., p. 854, Dec. 11, 2000; entry for "port (1) (electronic devices or networks)" doi: 10.1109/IEEESTD.2000.322230; published by IEEE, Piscataway, NJ, USA. (Year: 2000).*

Weidong, Ding, et al., "Time Syncronization Error and Calibration in Integrated GPS/INS Systems," ETRI Journal, Feb. 2008, pp. 1-9.

(Continued)

*Primary Examiner* — Bernarr E Gregory

(74) *Attorney, Agent, or Firm* — Fish & Richardson P.C.

(57) ABSTRACT

A navigation receiver, a navigation system and a method of time stamping asynchronous sensor measurements is provided. Sensor measurement data is received at a first port. A signal pulse is received at a second port. The signal pulse represents a time of measurement according to a first time domain of the received sensor measurement data. Based on the received signal pulse, a timestamp according to a second time domain is generated. The generated timestamp is associated in the second time domain with the received sensor measurement data.

22 Claims, 6 Drawing Sheets

(56) References Cited

OTHER PUBLICATIONS

InvenSense, Inc., "MPU-6500 Product Specification Revision 1.1," Mar. 5, 2014, pp. 1-40.
Bosch Sensortec GmbH, "Data Sheet BMI160 Small, low power inertial measurement unit," Feb. 2015, pp. 1-110.
Inside GNSS, "Unmanned Systems Week Welcome to GNSS/Inertial+Integration for Unmanned Systems," webinar presentation, Jun. 4, 2014, pp. 1-56.
u-blox AG, "u-blox 6 Receiver Description Including Protocol Specification," pages i-ii and 42-48, Apr. 18, 2013.

\* cited by examiner

TIME STAMPING ASYNCHRONOUS SENSOR MEASUREMENTS

BACKGROUND OF THE INVENTION

The present invention relates to the field of global navigation satellite system (GNSS) receivers. More particularly, the present invention relates to time stamping sensor measurements for use in a GNSS receiver.

Combining navigation information provided by one type of navigation system together with navigation information provided by another, different type of navigation system can bring substantial advantages over stand-alone navigation systems. These include improved accuracy and reliability and thus an increased level of navigational safety for many applications.

GNSS is a satellite navigation system which utilizes signals transmitted from a constellation of satellites orbiting the earth. The user interface to this navigation system comprises GNSS receivers configured to receive the satellite signals and process them to determine the user position, velocity and precise time (PVT). Typically GNSS receivers achieve this by processing the received satellite signals to generate code and carrier phase measurements which are forwarded to a filter to derive the navigation solution. GNSS has proven to be highly accurate. However, because GNSS signals are electromagnetic, they can be blocked or degraded by objects such as mountains, tall buildings, and dense foliage and by interference. Hence, stand-alone GNSS does not provide continuous and reliable navigation information all of the time.

Another type of navigation system that is widely used is an inertial navigation system (INS). INS uses sensors that detect acceleration and rate of rotation information which is used to estimate, by employing dead reckoning, relative position and velocity over time. The sensors may be included in an inertial measurement unit (IMU). An IMU measures linear and angular motion using integrated inertial sensors such as accelerometers and gyroscopes. Although INS can provide continuous information on position and velocity without interruption, it has the disadvantage that errors tend to accumulate over time resulting in the position and velocity estimates deviating from their correct values.

Combining GNSS and INS not only provides an efficient way of limiting the errors of INS, it also allows the possibility of determining position and velocity during periods of GNSS signal outage. A further advantage of combining GNSS and INS is that the time required to initially acquire position and velocity can be significantly reduced.

There are a number of ways in which the independent measurement data from GNSS and INS can be combined and processed. Most methods perform sensor fusion, i.e. fusing of the measurements from the GNSS receiver with the measurements from the IMU, using either a Kalman filter or a least-squares (LSQ) filter implemented by a processor. However, for the sensor fusion to be successful, measurements need to correspond essentially to the same point in time.

When a sensor fusion filter compares the outputs of two different navigation systems, i.e. GNSS and INS, it is important to ensure that those outputs correspond to the same time of validity (i.e. time at which the measurements were made). Otherwise, differences in the navigation system outputs due to the time lag between them will be falsely attributed by the filter to the states of the filter, thereby corrupting the estimates of those filter states.

Existing approaches to the problem of synchronizing measurements from two independent navigation systems rely on using some sort of timing reference signal output by the GNSS receiver and feeding this signal to the IMU. For instance, in addition to position and velocity, many GNSS receivers also provide at their output a one pulse-per-second (1 PPS) signal which is synchronized to GNSS time. The GNSS receiver calculates and updates pseudo-ranges, pseudo-range rates, carrier phases, carrier ranges, etc. upon the leading edge of the 1 PPS signal. This reference signal may be fed to the IMU and subsequently used to timestamp or synchronize the IMU data to GNSS time. However, these approaches require an IMU that can be synced to an external signal or require at least the introduction of an additional component, e.g. an integration processor, from which the IMU measurement outputs can be synchronized with the 1 PPS or a stable frequency reference from the GNSS receiver. In either case, an additional connection to the IMU is required which increases complexity and cost.

Therefore, an improved method of synchronizing GNSS and INS data is needed so that they can be combined and processed by the filter.

SUMMARY OF THE INVENTION

The present invention provides a navigation receiver, a navigation system and a method of time stamping asynchronous sensor measurements. In accordance with an embodiment, a method of time-stamping one or more asynchronous sensor measurements in a global navigation satellite system receiver is provided. Sensor measurement data is received at a first port. A signal pulse is received at a second port. The signal pulse represents a time of measurement according to a first time domain of the received sensor measurement data. Based on the received signal pulse, a timestamp according to a second time domain is generated. The generated timestamp is associated in the second time domain with the received sensor measurement data.

In accordance with a further embodiment, a global navigation satellite system receiver is configured to time-stamp one or more asynchronous sensor measurements. The receiver has a first port that is configured to receive sensor measurement data from at least one sensor. The receiver additionally has a second port configured to receive a signal pulse. The signal pulse represents a time of measurement according to a first time domain of the received sensor measurement data. A circuit of the receiver is configured to generate, based on the received signal pulse, a timestamp according to a second time domain. A processor of the receiver is configured to associate the generated timestamp in the second time domain with the received sensor measurement data.

In accordance with another embodiment, a global navigation satellite system receiver is configured to time-stamp one or more asynchronous sensor measurements. The receiver has a first port configured to receive sensor measurement data from at least one sensor. The receiver has a second port configured to receive a signal pulse. The signal pulse represents a time of measurement according to a first time domain of the received sensor measurement data. A processor of the receiver is configured to generate, based on the received signal pulse, a timestamp according to a second time domain and to associate the generated timestamp in the second time domain with the received sensor measurement data.

BRIEF DESCRIPTION OF THE DRAWINGS

The present invention is described with respect to particular exemplary embodiments thereof and reference is accordingly made to the drawings in which.

DETAILED DESCRIPTION OF A PREFERRED EMBODIMENT OF THE INVENTION

Figure 1:
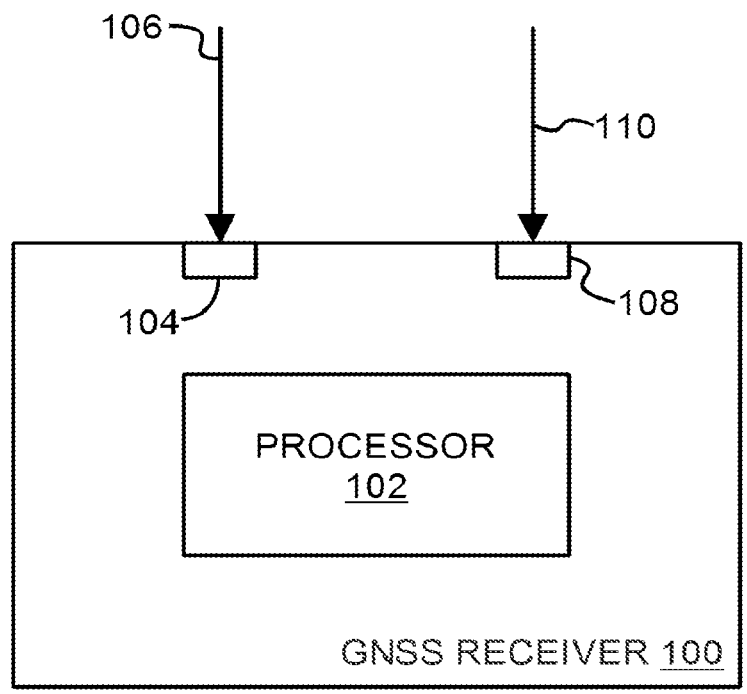
FIG. 1 illustrates a block schematic diagram of a navigation receiver for time stamping asynchronous sensor measurement data in accordance with an embodiment of the present invention.

References will now be made in detail to exemplary embodiments, examples of which are illustrated in the accompanying drawings. The following description refers to the accompanying drawings in which the same numbers in different drawings represent the same or similar elements unless otherwise specified. The implementations set forth in the following disclosure are consistent with aspects related to the invention as recited in the appended claims.

The present invention provides a global navigation satellite system (GNSS) receiver, a navigation system and a method of time stamping asynchronous sensor measurements or sensor measurement data. Because the sensors can operate independently from the GNSS navigation receiver and in many cases are external to the GNSS receiver, the sensor measurements are not necessarily generated according to the time base of the GNSS receiver, i.e. they are asynchronous. Unlike prior approaches, the present invention solves the problem of data synchronization between GNSS and other sources of navigation data, e.g. an inertial navigation system (INS) by accomplishing synchronization at the GNSS navigation receiver.

The sensor measurements or, more particularly, sensor measurement data, may be obtained from one or more sensors. The one or more sensors can be, for example, part of a sensor system, such as an inertial measurement unit (IMU) of an inertial navigation system (INS). Other examples of inertial sensors that can be used in connection with the present invention include, for example, an angular rate sensor, a gyroscope or an accelerometer. The methods set forth hereunder are equally applicable to measurements or measurement data originating from other types of sensors, e.g. a wheel counter or odometer, and a speedometer. The sensor measurements are initially in the time domain of the sensor producing the measurements, e.g. the time domain of the IMU, wheel counter, odometer, etc. According to aspects of the present invention, the sensor measurements are synchronized in time with the measurements made from GNSS satellite signals by receiving at the GNSS receiver an electrical timing signal from the sensor. This timing signal may be generated by the sensor and contains signal pulses that indicate that new sensor measurement data is available. These pulses in the electrical timing signal are used to timestamp the sensor measurements in the time domain of the GNSS receiver, i.e. a local receiver time. The GNSS receiver accomplishes this by using the signal pulses in the timing signal to generate a timestamp in the time base of the GNSS receiver for attributing to the received sensor measurements. The sensor measurements and the GNSS navigation signals can thereafter be fused together, for example, using either a Kalman filter or a least-squares (LSQ) filter implemented by a processor in accordance with known sensor fusion methods.

The sensor can obtain sensor measurements or measurement data independently and autonomously with respect to the GNSS navigation receiver. For example, the sensor or sensor system itself may control the times at which measurements are taken. Alternatively, the sensor or system may be prompted to take measurements by some other external device or source. In either case, an electrical timing signal generated by the GNSS receiver is not required to prompt the sensor or sensor system to provide measurement information. This is because the GNSS navigation receiver is informed, e.g., by the sensor or another source, that new sensor measurement data is available. The GNSS navigation receiver is also informed of the time that the measurement was taken.

More particularly, some sensor systems, e.g. commercially available IMUs provide a signal which indicates when new data from measurements taken by the sensor is ready at the IMU output. Measurements made by the on-board accelerometers and gyroscopes are fed to the IMU output. The new measurement data may be stored in a register in the IMU and a separate "data ready" signal may be output at a pin provided by the IMU. For example, the BMI160 IMU available from Bosch Sensortec GmbH provides, in addition to physical type of interrupts, several low-latency data driven interrupts at pins on the IMU. One such interrupt is the "data ready" interrupt which is triggered every time a new data sample from the on-board accelerometers and gyroscopes is available.

The inventors of the present invention have recognized that such a "data ready" signal can be used to timestamp asynchronous sensor measurements directly at the GNSS receiver without the need for feeding a synchronization signal, e.g. 1 PPS or some other reference signal, routed from the GNSS receiver to the sensor or sensor assembly, e.g. IMU.

The sensor measurements may be in a format that is native to the sensor or sensor system which produced the measurements. However, some GNSS receivers may require the sensor measurement data to be in a predetermined format in order for it to be processed by the GNSS receiver. In accordance with an embodiment of the present invention, a pre-processor may be provided that is configured to convert the native format of the sensor measurement data into a predetermined data message format that is compatible with the GNSS receiver. The messages may, for example, be formatted in accordance with a proprietary protocol supported by the GNSS receiver, for example a UBX-ESF message format supported by u-blox's GNSS receivers. In addition to a payload, the formatted messages may comprise one or more of a synchronization character in the message preamble, a message identification (ID) string, a length byte indicating the length of the payload and a checksum appearing at the end of the message for error correction. The skilled person will recognize that such a formatted message could be constructed in different ways.

FIG. 1 illustrates a block schematic diagram of a GNSS navigation receiver 100 for time stamping asynchronous sensor measurement data in accordance with an embodiment of the present invention. The navigation receiver 100 includes a processor 102 that is configured to perform processing functions described herein.

As shown in FIG. 1, the GNSS receiver 100 includes a port 104 which is configured to receive a timing signal 106. This timing signal 106 (e.g., the "data ready" signal described above) may be generated by a sensor or sensor system, such as an IMU for example. The navigation receiver 100 also includes a port 108 which is configured to receive sensor measurement data 110 from the sensor or sensor system. Thus, the GNSS receiver 100 has at least two inputs including the port 104 and the port 108. The port 104 is configured to receive an indication (e.g. a pulse or signal level transition in the signal 106) that indicates new sensor measurement data is available. This also indicates a time that the measurement was taken according to the time domain of the one or more sensors. The port 108 is configured to receive the sensor measurement data 110. The port 104 for receiving the timing signal 106 may, for example, be connected to a single pin of an integrated circuit of the receiver 100. Alternatively, the port 104 may include a differential signal input port. The port 108 for receiving the sensor measurements 110 may be in the form of, for example, a serial port interface (SPI), RS232 serial port or USB port.

A signal pulse or, more particularly, a signal level transition appearing on the electrical timing signal 106 as received by the receiver 100 is used by the processor 102 to timestamp the incoming asynchronous sensor measurements or measurement data. A relationship in frequency and phase between a clock signal used internally by the processor 102 and GNSS time will be known to the processor 102. This is because the processor 102 may also be used by the receiver 100 to process the GNSS satellite signals and derive position, velocity and GNSS time. Therefore, the timing signal pulse may be detected by the processor 102 and converted into a timestamp in absolute time or GNSS time for the corresponding sensor measurement data. Alternatively, the timing signal pulse may be detected by the processor 102 and thus generate a timestamp in a time domain corresponding to the local time of the GNSS receiver, i.e. local receiver time. Since it will be known how the local receiver time relates to GNSS time, the timestamps in GNSS time may be later derived during sensor fusion.

As described in more detail below, the processor 102 of the receiver 100 associates the timestamp generated from the signal pulse received at the port 104, together with the corresponding sensor measurement data received at the port 108. Generated timestamps and corresponding measurements may be stored, for example, in association with each other in memory (not shown) at the receiver 100.

Figure 2:
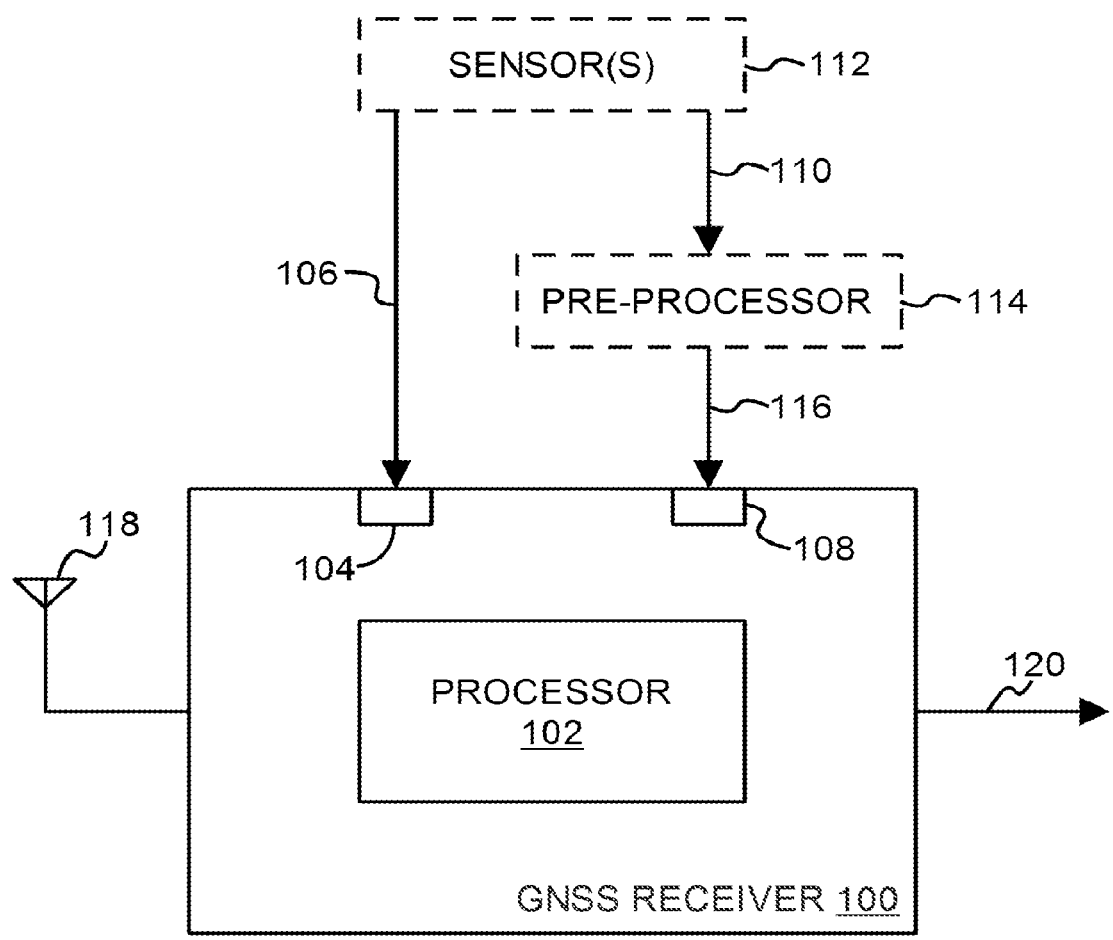
FIG. 2 illustrates a block schematic diagram of a navigation system for time stamping asynchronous sensor measurement data in accordance with an embodiment of the present invention.

FIG. 2 illustrates a block schematic diagram of a navigation system for time stamping asynchronous sensor measurement data in accordance with another embodiment of the present invention. As shown in FIG. 2, the system may include one or more sensors 112 that can generate the timing signal 106 and the measurement data 110, as are also shown in FIG. 1. The generation of timestamps for sensor measurement data received by the navigation system is carried out in a similar manner as described above in connection with FIG. 1. The one or more sensors 112 of FIG. 2 may include an angular rate sensor, a gyroscope, an accelerometer, a wheel counter or odometer, and/or a speedometer. The sensor(s) 112 may, for example, include a sensor system such as an IMU or the sensor(s) 112 can be integrated within an IMU. The one or more sensors 112 may be external to the GNSS receiver 100 or may alternatively be integrated into a GNSS module containing the receiver 100.

Also shown in FIG. 2 is an optional pre-processor 114. The one or more sensors 112 may generate sensor measurement data 110 in accordance with a format that is native to the sensor(s) 112. The pre-processor 114 is configured to format this sensor measurement data to produce formatted sensor measurement data 116 that is compatible with the receiver 100. For example, formatted sensor measurement data 116 generated by the pre-processor 110 may be in accordance with a pre-determined data message format that the receiver 100 is configured to receive. Because a timestamp is associated with each such message after the message is received by the receiver 100, the messages themselves do not need to contain timing information representative of any time of measurement of the sensor measurement data 110. The formatted sensor measurement data 116 is delivered to the receiver 100 via the port 108.

As time progresses, a number of pairs of timestamps and associated sensor measurements can be stored in memory. This stored information can be retrieved from memory and used to combine, e.g., by performing sensor fusion, the inertial measurements with the GNSS satellite signals for the same time of validity so as to generate resulting navigation information. This resulting navigation information 120 (e.g., one or more of global position, velocity and GNSS time, collectively referred to as PVT") can be available at an output of the receiver 100.

As shown in FIG. 2, the navigation receiver 100 is configured to receive GNSS satellite signals from GNSS satellites via an antenna 118. The receiver 100 is further is configured to process the received GNSS satellite signals to generate a navigation solution 120. The navigation solution generated by the receiver 100 may include the calculated position and velocity of the receiver 100 as well as a determination of precise GNSS time.

The processor 102 may perform these processing functions. More particularly, the receiver 100 receives satellite signals from one or more GNSS constellations and processes these signals to provide GNSS measurements such as pseudo-ranges, carrier phases, rates of pseudo-ranges, etc. to a navigation filter. The processor 102 may, for example, implement the filter, e.g. a Kalman filter or a least-squares (LSQ) filter, which is used to determine the navigation solution based on the GNSS measurements.

Figure 3:
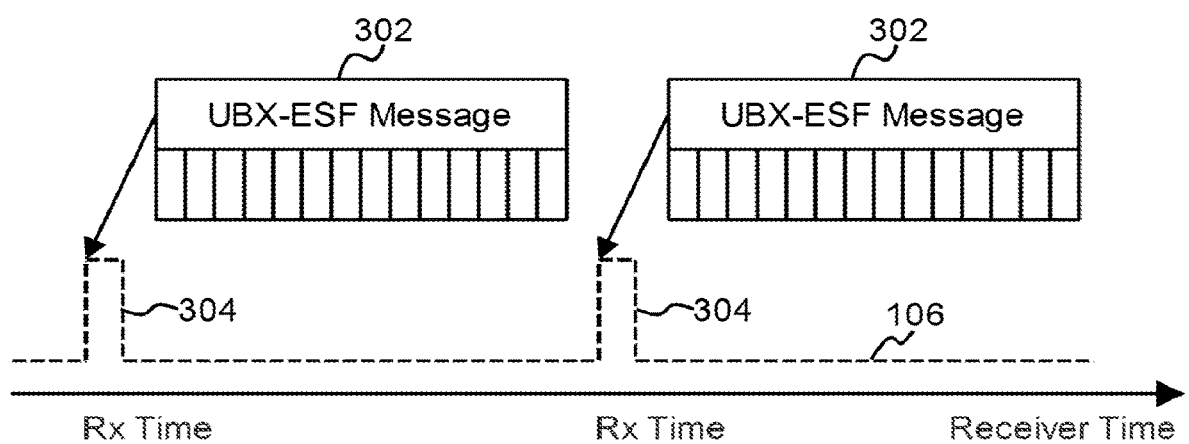
FIG. 3 illustrates a timing diagram for time stamping asynchronous measurement data in accordance with an embodiment of the present invention.

FIG. 3 illustrates a timing diagram for time-stamping asynchronous measurement data in accordance with an embodiment of the present invention. FIG. 3 shows a relationship between a timing signal 106 and formatted data messages 302 containing sensor measurement data. More particularly, as shown in FIG. 3, the timing signal 106 may comprise a normally low-voltage level (e.g. logic "zero"), which transitions to a high-voltage level (e.g. logic "one") upon the sensor measurement data being ready at the one or more sensors 112 (FIG. 2) and then, after a short period, i.e. duration of the signal pulse, the timing signal 106 returns to the low-voltage level. This is represented in FIG. 3 by synchronization pulses 304 appearing in the timing signal 106. In an embodiment, the leading edge of each signal pulse 304 coincides with the availability of the sensor measurement data. Although FIG. 3 shows the timing signal 106 as normally comprising a low-level voltage when no sensor measurement data 110 is available, the skilled person will quickly recognize that a high-voltage level (e.g. logic "one") could equally be used for the timing signal 106, in which case the signal 106 transitions to a low-level voltage (e.g. logic "zero") when new measurement data 110 is available at the sensor(s) 112. In other words, an inverted timing signal to that shown in FIG. 3 may alternatively be used.

The formatted data messages 302 will typically be available after a delay due to processing time of the pre-processor 114 (FIG. 2). Accordingly, the signal pulses 304 of the timing signal 106 (or leading edges thereof) may indicate that new sensor measurement data was obtained a short time before the corresponding formatted data message 302 is available to the receiver 100. The receiver 100 uses the signal pulses 304 of the timing signal 106 (e.g., the leading edge of the pulses) for generating the timestamp and subsequent processing as each pulse 304 indicates the time that a corresponding measurement was taken by the one or more sensors 112.

In embodiments without a pre-processor 114, each signal pulse 304 may also arrive slightly before the corresponding measurement data 110 arrives at the receiver 100. Thus, in most situations, regardless of whether a pre-processor 114 is employed or not, each timing pulse 304 from the sensor 112 will arrive at the receiver 100 slightly before the corresponding measurement data 110 (FIG. 1) or formatted measurement data 116 (FIG. 2) and thus the processor 102 will associate, i.e. link the most-recent received signal pulse 304 with the next received sensor measurement data 110 or formatted measurement data 116. However, the present invention may also be configured to associate the received signal pulse 304 with simultaneously received sensor measurement data 110 or formatted sensor measurement data 116. The present invention may also be configured to associate a later received pulse 304 with earlier received sensor measurement data 110 or formatted measurement data 116.

As described herein and shown in FIG. 2, the timing signal 106 is generated by the sensor 112. It will be apparent, however, that the timing signal 106 may be generated by another means. For example, the pre-processor 114 may generate the timing signal 106 provided to the receiver 100. The pre-processor 114 may accomplish this by generating a signal pulse each time new measurement data 110 is received from the sensor(s) 112. Alternatively, some other circuit or device may generate the timing signal 106 by monitoring the measurement data 110 generated by the sensor 112 and generating a pulse each time a new measurement data is available. Persons skilled in the art will understand that generation of the timing signal 106 and signal pulses 304 contained therein may be accomplished in various ways and by various means.

Figure 4:
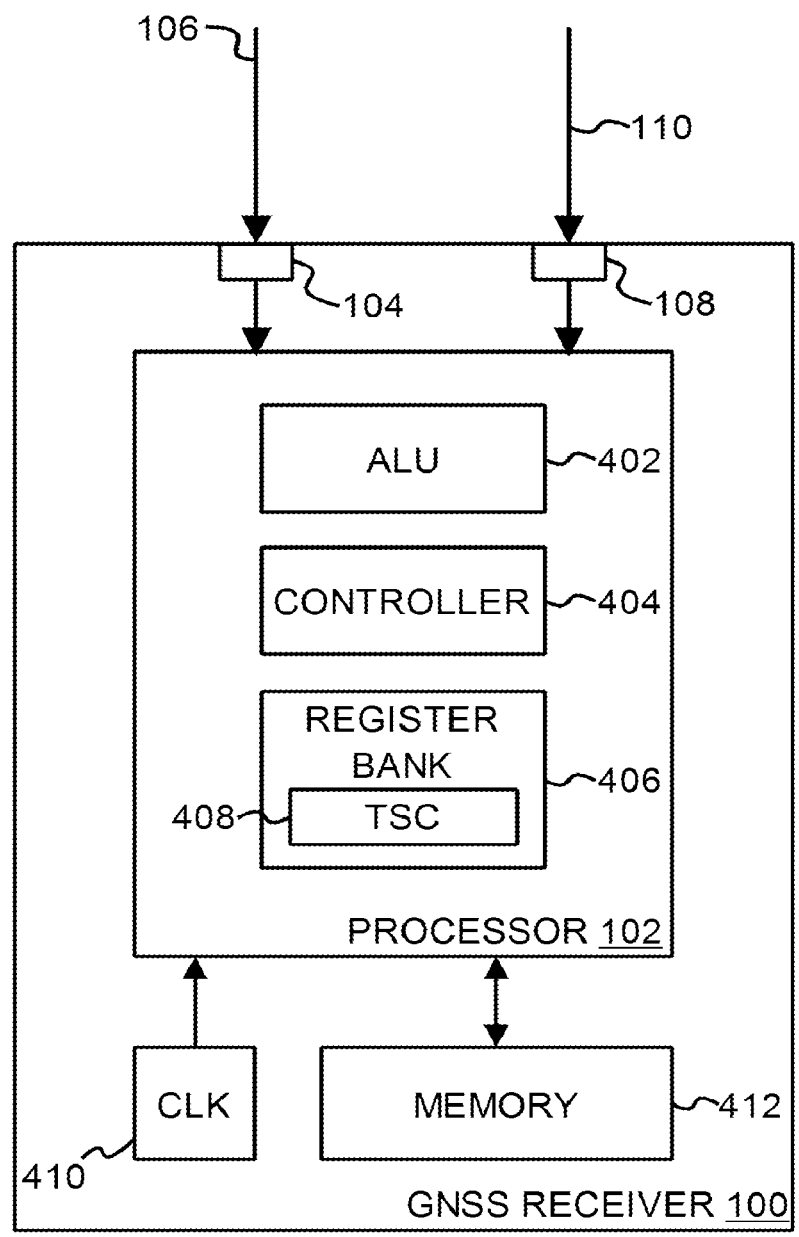
FIG. 4 illustrates a block schematic diagram of a navigation receiver having an interrupt and timer system for time stamping asynchronous measurement data in accordance with an embodiment of the present invention.

Multiple different embodiments of the GNSS receiver described herein may be implemented. FIG. 4 illustrates an embodiment of a GNSS navigation receiver 100 comprising an interrupt and timing system of a processor 102 internal to the receiver 100 for time stamping asynchronous sensor measurements in accordance with the present invention. This embodiment exploits an interrupt and a timestamp counter (TSC) present in many modern processors. Accordingly, this embodiment has the advantage of requiring minimal additional hardware other than such a processor. Thus, in this embodiment, the time-stamping is implemented using a combination of software and commercially available hardware.

As shown in FIG. 4, a processor 102 includes an arithmetic logic unit (ALU) 402, a controller 404 and a register bank 406 which includes a timestamp counter (TSC) 408. The TSC 408 is a register for which the counter value stored therein is incremented on every clock cycle of the processor 102. The clock signal may be, for example, a 48 MHz clock signal generated by a clock 410 connected to the processor 102. Because this clock signal is used to increment the TSC 408 and thus indicates time associated with the processor 102, the TSC 408 may therefore provide the highest resolution timing information available to the processor 102. The TSC 408 may be used to timestamp the sensor measurement data 110, 116 using synchronization pulses 304 as they are received via the timing signal 106. And, because the processor 102 may be the same processor used to process the GNSS satellite signals, the relationship in frequency and phase between the clock signal and GNSS time will be known to the processor 102. Thus, the processor 102 is able to provide a timestamp in the GNSS time base. If needed, the value from the TSC 408 may be converted into the timestamp, for example, if the fusion process requires the timestamp to be in a particular format different from that generated by the time TSC 408.

As shown in FIG. 4, the receiver 100 also includes one or more memory units 412 used by the processor 102 for various functions described herein, including for storing software, pairs of timestamps and corresponding measurements, as well as temporary values from various calculations for performing sensor fusion. The register bank 406 may also be used to temporarily store sensor measurement data 110, 116 received from one or more sensors and to make this measurement data available to the processor 102 for storing the sensor measurement data with the corresponding timestamps in memory 412 and for performing sensor fusion.

In accordance with the embodiment shown in FIG. 4, the timing signal 106 may be applied to an interrupt input (e.g. a pin) of the processor 102 which is then received by the processor controller 404 to trigger interrupts. An interrupt is generated in response to a signal pulse 304 or, more particularly, a leading edge or falling edge thereof, in the timing signal 106. The processor 102 then runs an appropriate interrupt service software routine (i.e. an "interrupt handler") according to a memory location vector accessed in response to the interrupt. The interrupt handler prioritizes interrupts and saves them in a queue if more than one interrupt is waiting to be handled.

The action on the interrupt input which triggers an interrupt on the processor controller 404 may be set using an interrupt mode of the particular interrupt being monitored by the controller 404. For example, a "RISING" interrupt mode activates an interrupt on a rising edge appearing at the interrupt pin. However it is also possible to set the interrupt mode to "FALLING" which activates an interrupt on a falling edge appearing at the pin. The interrupt mode may be selected depending on the nature of the timing signal generated by the sensor.

The processor controller 404 is configured to run the interrupt service routine each time the interrupt condition is met. This software may be written in assembly code, C, C++ or a combination thereof. The interrupt service routine may contain code that causes the counter value in the TSC 408 to be copied to a register of the register bank 406 or to the memory 412. This stored counter value may then be used as a timestamp for the corresponding asynchronous sensor measurement data 110 or 116 received at the port 108 of the receiver 100. Alternatively, the stored counter value can be converted to the timestamp. The program may also cause the corresponding sensor measurement data 110 or 116 to be retrieved from the register bank 406 and for this measurement to be stored in association with the corresponding timestamp, e.g., in memory 412. The measurement data and corresponding timestamp may therefore be stored together in memory 412 for later processing by an additional software program that combines the GNSS measurements with the sensor measurement date, e.g., by performing sensor fusion. Such a software program may be also stored in the memory 412.

Figure 5:
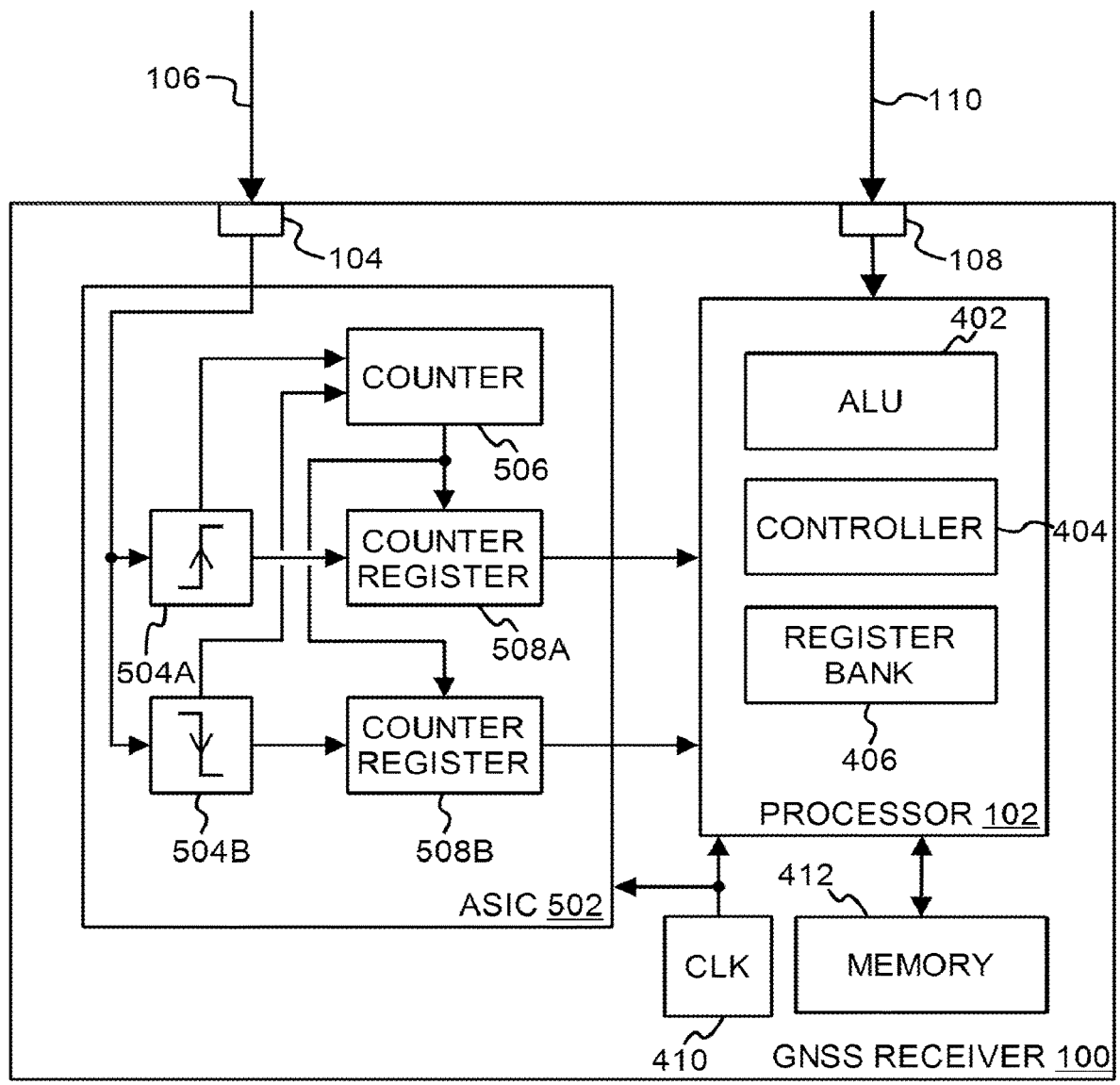
FIG. 5 illustrates a block schematic diagram of a navigation receiver for time stamping asynchronous measurement data employing an application-specific integrated circuit in accordance with an embodiment of the present invention.

In another embodiment of the GNSS receiver, the time-stamping in accordance with the present invention may be implemented using an application specific integrated circuit (ASIC) that interfaces between the internal processor of the receiver and the one or more sensor(s), e.g., the IMU. FIG. 5 illustrates an embodiment of a navigation receiver 100 configured to perform time stamping of asynchronous sensor measurement data using an ASIC 502 in accordance with an embodiment of the present invention.

As shown in FIG. 5, the ASIC 502 and processor 102 may be integrated into the GNSS receiver 100 together with a memory 412 and a clock 410. The ASIC 502 preferably comprises a dedicated input, which may be an input/output (IO) pin configured to receive an external signal such as the timing signal 106, one or more edge-detection circuits, hereafter edge detectors, 504A, 504B, a timer counter 506 and one or more counter registers 508A, 508B.

The dedicated input of the ASIC 502 may be implemented as a general-purpose input output (GPIO) pin and is coupled to an input of the one or more edge detectors 504A, 504B. This input is configured to receive the timing signal 106 from the one or more sensor(s), e.g. IMU. In this case, the port 104 may comprise the dedicated input of the ASIC 502. Each edge detector 504A, 504B may, for example, be implemented using two latches arranged in a master-slave setup to provide a flip-flop circuit. Although not explicitly shown in FIG. 5, the skilled person will appreciate that the flip-flop circuit or latches may need to be clocked with a clock signal. Thus the edge detector 504A, 504B may in one embodiment be clocked with a signal from clock 410. In one embodiment, the edge detector 504A may be configured to detect a rising edge of a signal pulse 304 in the timing signal 106, while the edge detector 504B may be configured to detect a falling edge of a signal pulse 304 in the timing signal 106. Thus, the ASIC 502 is preferably compatible with sensors such as inertial sensors and IMUs that generate data ready pulses whose leading or falling edge essentially correspond to the time instant of availability of measurement data. An output of the edge detector 504A is coupled to a counter register 508A while an output of the edge detector 504B is coupled to a counter register 508B. The counter 506 may essentially be a register whose stored value is incremented upon each cycle of a clock signal. The counter registers 508A, 508B may be used for storing a current counter value from timer counter 506 which may serve as the timestamp for the corresponding sensor measurement data received by the GNSS receiver 100. Upon detection of a signal pulse 304 in the timing signal 106 by one of the edge detectors 504A or 504B, the current counter value of the counter 506 is copied into one of the registers 508A or 508B. This copying may be triggered on a rising or falling edge of the signal pulse arriving on the timing signal 106.

The counter 506 may essentially be a register whose stored value is incremented upon each cycle of a clock signal. The clock signal used by the counter 506 is preferably, though not necessarily, the same clock signal used by the processor 102 of this embodiment and, thus, it is a measure of local time of the processor 102. As in the embodiment of FIG. 4, this may be a 48 MHz clock signal generated by the clock 410. If the same processor is also used to process the GNSS satellite signals, the relationship of GNSS time to the local time of the GNSS receiver will be known. If needed, the value from the timer counter 506 can be converted into the timestamp, for example, if the fusion process requires the timestamp to be in a particular format different from that generated by the time counter 506. The counter 506 can be implemented in hardware, software or combination thereof. Each edge detector 504A and 504B is not only connected to the counter 506 but also to a corresponding register. The connection to the counter 506 triggers copying the value in the counter 506, the other connection tells the ASIC 502 where the copy of the counter value should be stored (e.g., among the registers 508A and 508B).

Similarly to the embodiment of FIG. 4, the processor 102 of FIG. 5 may include a processor controller 404 which is configured to control operation of the receiver 100 of FIG. 5, by executing software programs and routines. The processor 102 may also include one or more memory units 412 which may be used by the processor 102 for various functions described herein, including for storing software and temporary values from various calculations for combining the GNSS measurements derived from the satellite signals with the sensor measurement data, e.g. by performing sensor fusion as described herein. The processor 102 of FIG. 5 may also include a register bank 406. The register bank 406 may be configured to receive sensor measurement data 110 or formatted sensor measurement data 116 from one or more sensors and to make this measurement data available to the controller 404.

When a new measurement arrives to the GNSS receiver 100 via port 108, this can trigger the processor 102 to collect the timestamp from the ASIC 502. In this case, the processor 102 can continuously monitor the port 108 for new sensor measurement data. In the case of the sensor measurements being formatted (e.g., as UBX-ESF messages), information contained in the formatted message can trigger a function call which causes the processor 102 to save the measurement and associated timestamp in memory 412. In this case, an IO task monitors the input buffers connected to port 108 and processes the data therein in order and based on the input message contents in order to trigger an appropriate message handling function.

Alternatively, depending on the configuration of the interface port 108, e.g. universal serial bus (USB), the fact of a message arriving on the port 108 can trigger the processor 102 to retrieve and process the message. In this case, the arrival of the message acts essentially as an interrupt to the processor 102 to retrieve and process the measurement data from the port 108. Another manner in which the processor 102 may be informed when a new timestamp (and measurement) is ready to be retrieved is by implementing a software event which is triggered by one of the edge detectors 504A or 504B. More particularly, every time a signal pulse is detected by the edge detector, this triggers a software event which informs the processor 102 to retrieve the timestamp (and measurement).

Once the processor 102 is notified of the new sensor measurement, the controller 404 runs a software program, which causes the sensor measurement data 110, e.g., contained in the register bank 406, and the corresponding timestamp contained in the counter register 508A or 508B to be retrieved. Each measurement and corresponding timestamp are preferably stored in association with each other, e.g., together in the same location in memory 412. The measurements and corresponding timestamps are therefore available for later processing by further software that performs sensor fusion.

The processor 102 needs to know from which of the registers 508A or 508B it should retrieve the current timestamp. In one embodiment, the processor 102 is so informed because the formatted messages received at port 108 and containing the sensor measurements may also contain a designated field that indicates whether the expected signal pulse is a rising edge or falling edge. As shown in FIG. 5, the register 508A corresponds to a rising edge while the register 508B corresponds to a falling edge. In this way, the processor 102 is informed which of the registers contains the corresponding timestamp for the received measurement data. For instance, if the designated field in the formatted message 302 indicates that a signal pulse 304 with a falling edge corresponding to the sensor measurement data 110 is expected, the processor 102 will be directed to retrieve the timestamp from register 508B.

While two registers 508A and 508B are shown in FIG. 5, there could be more such registers. For example, there could be two pairs of edge detectors, where one pair of edge detectors 504A, 504B is connected to a first pin (e.g. port 104), as shown in FIG. 5. A second pair of edge detectors (not shown) may be connected to another input pin (e.g. port not shown). The structure of the port 104, edge detectors 504A, 504B and registers 508A, 508B is essentially duplicated. Therefore, there could be, for example, a total of four such registers with each register triggered by a respective edge detector. In this case, the processor 102 may so informed because the formatted messages received at port 108 and containing the sensor measurements may also contain a designated field identifying the pin (e.g. port 104) on which the signal pulse arrives. This port identification, along with the indication of whether the expected signal pulse is a rising edge or falling edge, can be used to identify a particular one of the registers that contains the corresponding timestamp for the received measurement data.

Alternatively, the timestamp may be selected from an appropriate one of the registers based on the register whose value changed last. Thus, the processor 102 can monitor all timestamp registers (e.g. 508A, 508B in FIG. 5) and the selection of which register the timestamp should be retrieved is based on which register was last updated.

When the sensor measurements along with the associated timestamps are brought together with the GNSS measurements for fusion, the timestamps (i.e. counter values) can be converted into a format that is compatible with the GNSS measurement timestamps. This conversion can be performed before or after the timestamps are stored together with the sensor measurements.

In one embodiment, both the processor 102 and the ASIC 502 are clocked by the same clock signal generated by the clock 410. In this case, the GNSS measurements are processed by the processor 102 according to this same clock signal, i.e. local processor time of the GNSS receiver. Thus, the time domain of the sensor measurement data 110 is converted directly to the time domain of the processor 102 using the timestamp generated by the counter 506. Since the relationship between the local time of the GNSS receiver and GNSS time will be known, the processor is able to relate the generated timestamps for the sensor measurement data to GNSS time. In another embodiment, the processor 102 and the ASIC 502 are clocked by different clock signals, e.g. clock 410 and CLK2 (not shown in FIG. 5). In this case, the GNSS measurements are processed by the processor 102 according to its own clock signal. Thus, the time domain of the sensor measurement data 110 is first converted to the time domain of the ASIC 502 according to the timestamp generated by the counter 508. This timestamp however then needs to be converted to a third time domain, i.e., the time domain of the processor 102 and the GNSS measurements. This may accomplished, for example, by a synchronization structure between the registers 508A, 508B and the processor 102 or by software running on the processor 102 (or a combination of both). Persons skilled in the art will understand that this synchronization between the two clocks, e.g. clock 410 and CLK2 (not shown) in the GNSS receiver 100 may be accomplished in various ways and by various means.

In the embodiments illustrated in FIGS. 4 and 5, the processor 102 associates the generated timestamp with the received sensor measurement data as described herein. The processor 102 may also perform GNSS fusion in which the timestamps and associated sensor measurement data are fused with the GNSS measurement data. Alternatively, the GNSS fusion can be performed by a different processor. In this case, the timestamps may need to be converted to a time domain of the additional processor. For example, the timestamps may be converted from the time domain of the processor 102 to the time domain of the additional processor.

In both embodiments illustrated in FIGS. 4 and 5, the storing of the timestamp in memory may occur before or after the corresponding sensor measurement data is received by the GNSS receiver. Regardless of the order in which they are stored in memory, the timestamp and corresponding measurement data are associated with each other. This may be accomplished by storing both the timestamp and corresponding measurement data in memory together at the same or adjacent memory locations or in some other manner that maintains a logical connection between the timestamp its corresponding measurement data. For example, the generated time stamps in the time domain of the receiver 100 may be embedded into the sensor measurement data 110, 116 and then stored in the memory 412.

Also in both embodiments illustrated in FIGS. 4 and 5, association of the generated timestamp with the sensor measurement data 110, 116 may occur for sensor measurement data received before the signal pulse 304 of the timing signal 106, after the signal pulse or even for sensor measurement data 100, 116 received at the same time as the signal pulse.

The software that is used to control the processor 102 of FIGS. 4 and 5 to perform the functions described herein may be written in assembly code, C, C++ or a combination thereof.

Figure 6:
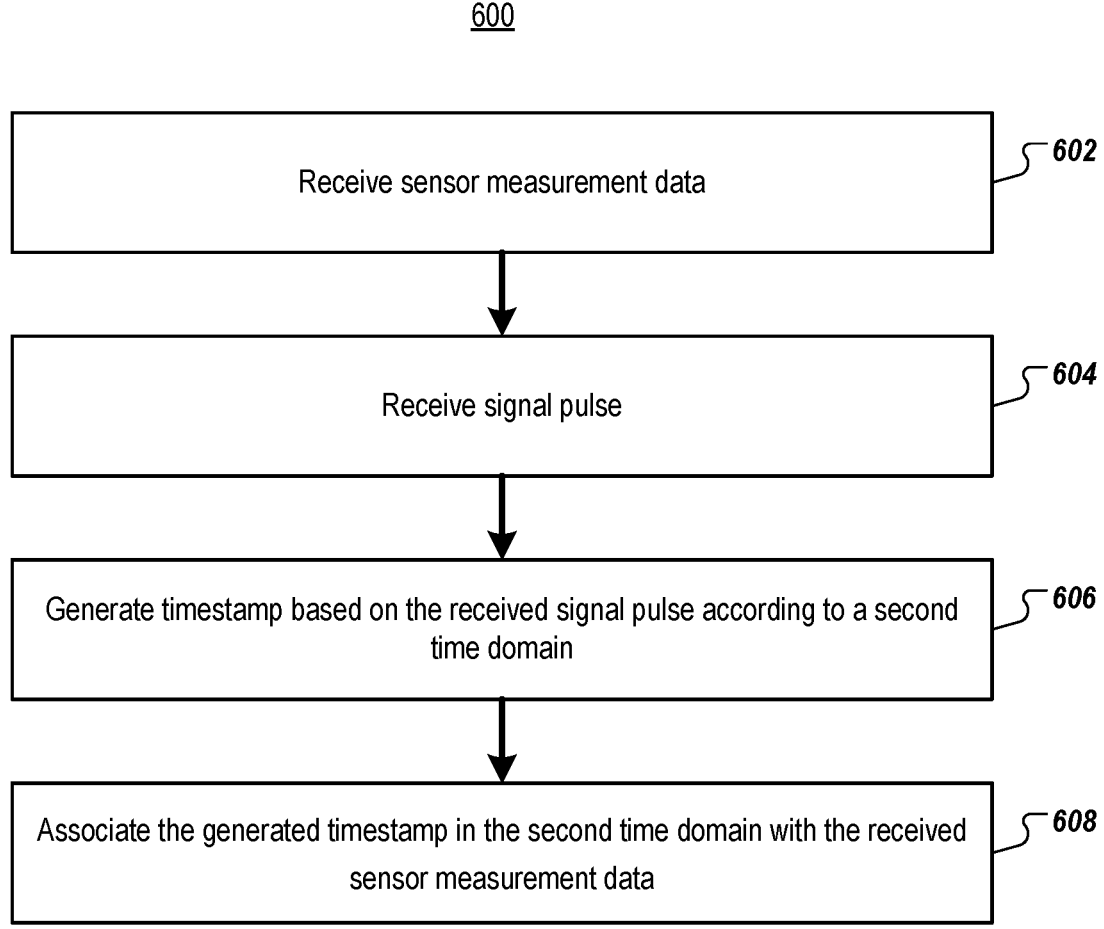
FIG. 6 illustrates a flow diagram of a method of time stamping asynchronous sensor measurement data in a global navigation satellite system receiver in accordance with an embodiment of the present invention.

FIG. 6 illustrates a flow diagram of a method 600 of time stamping one or more asynchronous sensor measurements in a global navigation satellite system receiver in accordance with an embodiment of the present invention. The method 600 may be performed, for example, by any of the embodiments illustrated in FIGS. 1-2 and 4-5. As shown in FIG. 6, in a step 602, sensor measurement data 110, 116 is received. The sensor measurement data may be received at a first port (e.g., port 108). In a step 604, a signal pulse 304 is received. The signal pulse may be received via the timing signal 106 received at a second port (e.g., port 104). The pulse in the timing signal represents a time of measurement according to a first time domain of the sensor measurement. The first time domain may be that of one or more sensors, e.g. inertial sensors or a sensor system, e.g. IMU that carries out the measurement. The time of measurement may be represented by a leading or falling edge transition of the signal pulse. In a step 606, a timestamp is generated based on the received signal pulse according to a second time domain. The second time domain may correspond to GNSS time. In a step 608, the timestamp generated in the second time domain in step 606 is associated with the sensor measurement data received in step 602.

In a further, optional step, the timestamp generated in the second time domain may be stored in a memory in association with the corresponding sensor measurement data. The sensor measurement data may optionally be pre-processed to generate at least one formatted sensor measurement data message containing the sensor measurement data.

The method may additionally include a step of receiving global navigation satellite signals and computing one or more of a position, a velocity and a global navigation satellite system time using GNSS measurements derived from the satellite signals and the sensor measurement data received at the GNSS receiver.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A global navigation satellite system receiver configured to time-stamp one or more asynchronous sensor measurements, wherein the receiver comprises:
   a first port;
   a second port;
   a circuit configured to generate, based on a signal pulse, a timestamp according to a second time domain, wherein the signal pulse is received at the second port and represents a time of measurement according to a first time domain of sensor measurement data, wherein the sensor measurement data is received at the first port from at least one sensor, the circuit further comprising an edge detector configured to detect at least one of a rising edge and falling edge in the signal pulse; and
   a processor configured to associate the generated timestamp in the second time domain with the received sensor measurement data.

2. The receiver according to claim 1, wherein the processor is further configured to store the generated time stamp together with the associated sensor measurement data in memory.

3. The receiver according to claim 1, wherein the second time domain corresponds to a local time of the receiver.

4. The receiver according to claim 3, wherein the local time of the receiver has a known relationship to global navigation satellite system time.

5. The receiver according to claim 1, the circuit further comprising a counter and a counter register, and the circuit being configured to store a counter value in the register upon detection of the at least one of a rising edge and a falling edge in the signal pulse, wherein the counter value represents the time of measurement of the sensor measurement data in the second time domain.

6. The receiver according to claim 1, wherein the processor is further configured to receive satellite signals from the global navigation satellite system and to compute one or more of a global position, a velocity and a global navigation satellite system time based on the received satellite signals and the received sensor measurement data.

7. A navigation system comprising the receiver according to claim 1 and a pre-processor configured to receive the sensor measurement data from the at least one sensor and the pre-processor configured to generate at least one formatted sensor measurement data message containing the sensor measurement data.

8. A global navigation satellite system receiver configured to time-stamp one or more asynchronous sensor measurements, wherein the receiver comprises:
   a first port;
   a second port; and
   a processor configured to: (i) generate, based on a signal pulse, a timestamp according to a second time domain and associate the generated timestamp in the second time domain with sensor measurement data, wherein the signal pulse is received at the second port and represents a time of measurement according to a first time domain of the sensor measurement data, and wherein the sensor measurement data is received at the first port from at least one sensor, and (ii) generate an interrupt and execute an interrupt handler in response to receiving at least one of a rising edge and a falling edge in the signal pulse.

9. The receiver according to claim 8, wherein the processor is further configured to store the generated timestamp together with the associated sensor measurement data in memory.

10. The receiver according to claim 8, wherein the second time domain corresponds to a local time of the receiver.

11. The receiver according to claim 10, wherein the local time of the receiver has a known relationship to global navigation satellite system time.

12. The receiver according to claim 8, wherein the interrupt handler stores a counter value in memory, the counter value representing the time of measurement of the sensor measurement data in the second time domain.

13. The receiver according to claim 8, wherein the processor is further configured to receive satellite signals from the global navigation satellite system and to compute one or more of a global position, a velocity and a global navigation satellite system time based on the received satellite signals and the received sensor measurement data.

14. A navigation system comprising the receiver according to claim 8 and a pre-processor configured to receive the sensor measurement data from the at least one sensor and the pre-processor configured to generate at least one formatted sensor measurement data message containing the sensor measurement data.

15. A method of time-stamping one or more asynchronous sensor measurements in a global navigation satellite system receiver comprising:
   receiving sensor measurement data, from at least one sensor, at a first port;
   receiving a signal pulse at a second port, wherein the signal pulse represents a time of measurement according to a first time domain of the received sensor measurement data;
   generating based on the received signal pulse a timestamp according to a second time domain;
   utilizing an edge detector to detect at least one of a rising edge and a falling edge in the received signal pulse; and
   associating the generated timestamp in the second time domain with the received sensor measurement data.

16. The method according to claim 15, further comprising storing the generated timestamp together with the associated sensor measurement data in a memory.

17. The method according to claim 15, wherein the second time domain corresponds to a local time of the receiver.

18. The method according to claim 17, wherein the local time of the receiver has a known relationship to global navigation satellite system time.

19. The method according to claim 15, further comprising storing a counter value in a register upon detection of the at least one of a rising edge and a falling edge in the signal pulse, wherein the counter value represents the time of measurement of the sensor measurement data in the second time domain.

20. The method according to claim 15, further comprising generating an interrupt in response to receiving at least one of a rising edge and a falling edge in the signal pulse and executing an interrupt handler, wherein the interrupt handler stores a counter value in memory, the counter value representing the time of measurement of the sensor measurement data in the second time domain.

21. The method according to claim 15, further comprising receiving satellite signals from the global navigation satellite signals and computing one or more of a global position, a velocity and a global navigation satellite system time based on the satellite signals and the received sensor measurement data.

22. The method according to claim 15, further comprising pre-processing the sensor measurement data to generate at least one formatted sensor measurement data message containing the sensor measurement data.

\* \* \* \* \*